Figure 1:
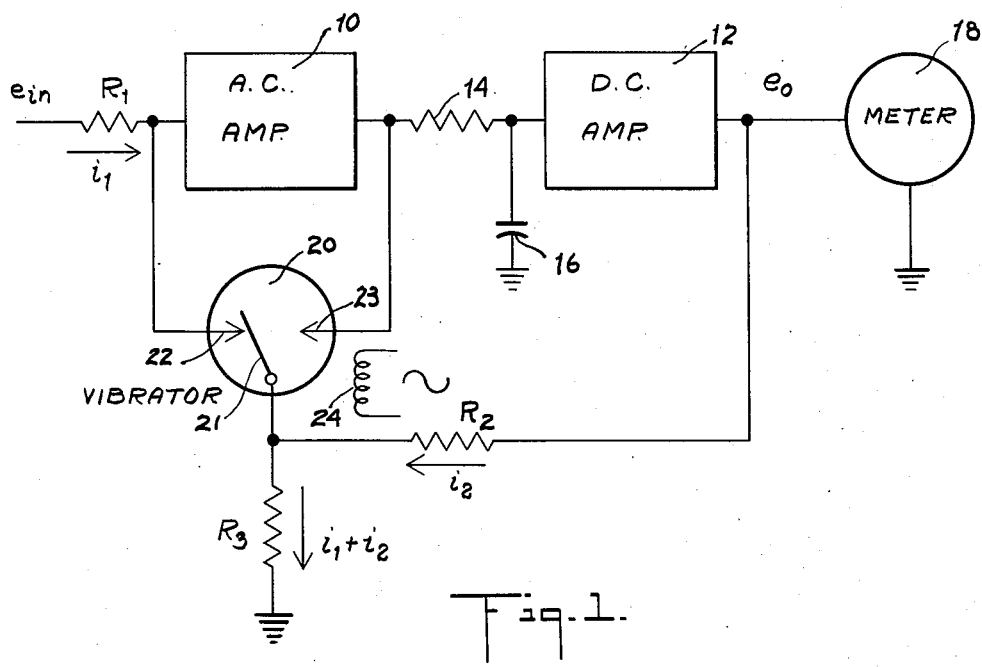

INVENTOR.
RAWLEY D. MCCOY
BY
Burgess, Ryan & Hicks
ATTORNEYS

June 11, 1957 R. D. McCOY 2,795,653
VACUUM TUBE VOLTMETER AMPLIFIER CIRCUIT
Filed Nov. 12, 1953 2 Sheets-Sheet 2

INVENTOR.
RAWLEY D. MCCOY
BY
Burgess, Ryan & Hicks
ATTORNEYS

United States Patent Office 2,795,653
Patented June 11, 1957

2,795,653

VACUUM TUBE VOLTMETER AMPLIFIER CIRCUIT

Rawley D. McCoy, Bronxville, N. Y., assignor to Reeves Instrument Corporation, New York, N. Y., a corporation of New York Application November 12, 1953, Serial No. 391,450

4 Claims. (Cl. 179—171)

This invention relates to electronic amplifying systems and more particularly to a stable high gain direct current amplifier ideally suited for applications requiring a high input impedance such as vacuum tube voltmeters and other control and measuring equipment.

While the general usefulness of this invention will become apparent as the description proceeds, for simplicity, the invention will be discussed in connection with its use as a vacuum tube voltmeter because of the high standards that must be met by electronic equipment in such applications. Vacuum tube voltmeters are used to measure both D. C. and A. C. potentials and are widely employed in the electronic field for measurement of potentials in high impedance circuits. In order to measure the potential, for instance, in a high impedance circuit it is necessary that the impedance of the measuring instrument be many times the impedance of the circuit in order to prevent any alteration of the operating characteristics of the circuit tested which would produce erroneous readings. Furthermore, since test equipment must be calibrated against standards in order to attain high orders of accuracy, it is desirable to provide a measuring instrument having a high degree of stability or substantially zero drift over long periods of time. These factors have presented a serious problem because the high impedance input requirements for a voltmeter which is usually of the order of 10 or more megohms tends to produce considerable instability. In addition, the difficulty of attaining high impedance and stability is further complicated by the need for high gain or amplification to facilitate the measurement of minute potentials.

This invention provides a circuit and method of operation that not only offers a solution of the foregoing problems but in addition provides a relatively simple system particularly suited for direct current vacuum tube voltmeter devices and other direct current amplifier applications. These ends are attained by means of a novel and improved circuit and arrangement of components which enables the utilization of inexpensive components to produce stable high gain circuits and at the same time enables the attainment of a very high input impedance and a low output impedance for operating a meter or other low impedance load.

Another important factor to be considered particularly in connection with measuring equipment is means to prevent possible overloading and consequent injury of sensitive meters or other measuring instruments forming the indicator. Since it is desirable for vacuum tube voltmeters to measure voltages of the order of .1 volt to 1000 volts or more, a wrong setting can produce considerable damage. Accordingly, it is another object of the invention to provide a vacuum voltmeter that is arranged to provide very high sensitivities and at the same time protect the indicating instrument against accidental damage.

Still another object of the invention is an electronic amplifier of high gain and stability wherein a portion of the output voltage is periodically fed to the input to provide high input impedance and at the same time modulate the D. C. potential applied to the input.

A further object of the invention is an improved voltage amplifier circuit employing a pentode vacuum tube wherein a gain substantially equal to the amplification factor is secured and linear amplifying characteristics are obtained notwithstanding differences in the transconductance of different tubes of the type for which the circuit is designed.

The above and other objects and advantages of this invention will become more apparent from the following description and accompanying drawings illustrating one embodiment thereof.

Figure 2:
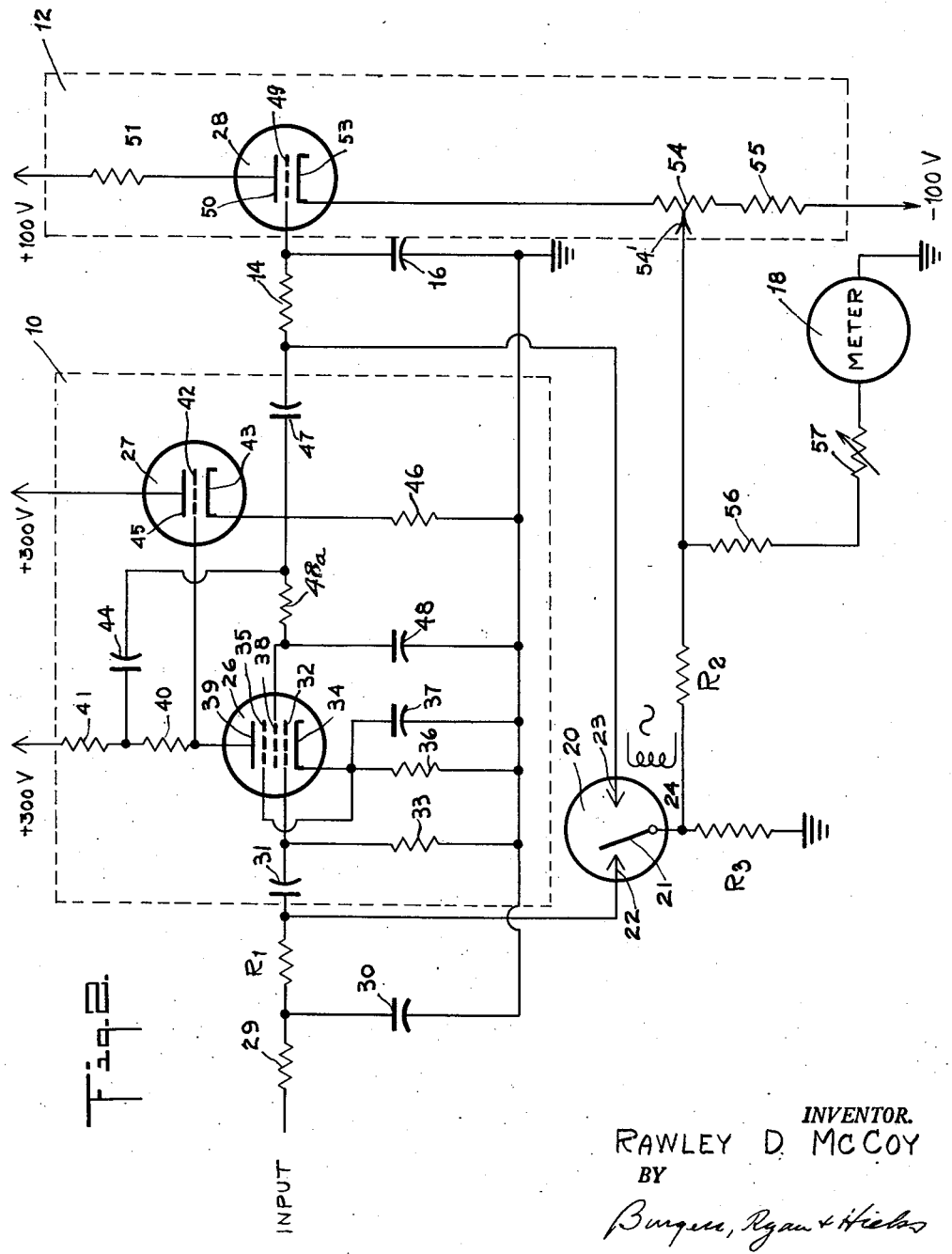

In the drawings:

Fig. 1 is a simplified block diagram of the invention illustrating certain aspects thereof; and Fig. 2 is a circuit diagram of a vacuum tube voltmeter embodying the invention.

Briefly, the invention utilizes an A. C. amplifier and a D. C. amplifier connected in cascade with means for modulating the signal applied to the A. C. amplifier and demodulating its output so that the device will accurately measure D. C. potentials. The modulating means in addition to modulating the input D. C. potential also provides feedback between the output and input circuits in order to attain the necessary high input resistance. These elements are illustrated in the block diagram Fig. 1 which serves to explain certain of the principles of the invention.

In this figure the A. C. amplifier is denoted by the numeral 10 while the D. C. amplifier is denoted by the numeral 12. These amplifiers are coupled by a low-pass filter comprising a resistor 14 and a condenser 16 connected between the output side of resistor 14 and ground. The input circuit of the A. C. amplifier 10 includes a series resistor $R_1$ while a meter 18 is connected between the output of the D. C. amplifier and ground. Since the basic input signal $e_{in}$ is direct current it must be modulated in some manner in order to enable its amplification by the A. C. amplifier 10. The amplified signal must then be demodulated in order to register on the D. C. indicating instrument 18 connected in the output of the D. C. amplifier 12. These ends are attained through a new and improved circuit arrangement employing a single-pole double-throw vibrator interconnected with the A. C. amplifier 10 and the output of the D. C. amplifier 12 so that in addition to the modulation and demodulation, the vibrator functions to attain a high input impedance for the A. C. amplifier which is an essential requirement for vacuum tube voltmeters.

More particularly, the vibrator 20 includes a pair of fixed contacts 22 and 23 with the contact 22 connected to the input of the A. C. amplifier 10 and the contact 23 to the output side of that amplifier. The vibrator armature 21 is connected to the junction of two series connected resistors $R_2$ and $R_3$ which forms a voltage divider between the output of the D. C. amplifier 12 and ground. In actual practice the resistor $R_3$ is very small as compared with resistor $R_2$ in order to get the desired feedback voltage to the input of the A. C. amplifier and provide effective demodulation of the amplified A. C. signal. The vibrator is operated by an electromagnetic coil 24 connected to a suitable source of alternating current such as 60 cycle current that is commonly available.

The input impedance may be computed as follows:

When the vibrator arm 21 is closed on contact 22 the voltage at the input of the A. C. amplifier is $e_{in} - i_i R_1$ since the input and output voltages are in phase. When it is open the input voltage is $e_{in}$. Thus a square wave signal of an amplitude $i_i R_1$ is fed to the A. C. amplifier. Therefore $$e_o = i_i R_1 K \text{ (where K is the overall amplifier gain)}$$

Also $$e_{in} = i_1 R_1 + (i_1 + i_2) R_3$$
$$e_o = i_2 R_2 + (i_1 + i_2) R_3$$

From the above equations $$i_1 = \frac{e_o}{R_1 K}$$

$$i_2 = \frac{e_{in} - e_o\left(\frac{R_3}{R_1 K} + \frac{1}{K}\right)}{R_3}$$

Then $$\frac{e_{in}}{e_o} = \frac{R_1 R_3 K + R_1 R_2 + R_1 R_3 + R_2 R_3}{R_1 R_2 K + R_1 R_3 K}$$

and $$\frac{Z_{in}}{2} = \frac{e_{in}}{i_1} = \frac{e_{in}}{e_o} \times R_1 K = \frac{R_1 R_3 K + R_1 R_2 + R_1 R_3 + R_2 R_3}{R_2 + R_3}$$

The factor 2 in the last equation above arises because the current $i_1$ flows only half the time. Moreover, practical considerations such as the fact that $R_3$ must be low in comparison to $R_2$ and that $R_2$ must be much smaller than $R_1$ (for the case of a current amplifier) permits simplification of the impedance equation with relatively little error to:

$$Z_{in} = \frac{2(R_1 R_3 K + R_1 R_2)}{R_2}$$

Actual input impedance computations based on an amplifier with an overall gain of about 500, and resistor values of $R_1 = 500$ kilohms, $R_2 = 10$ kilohms and $R_3 = 250$ ohms produces an input impedance of about 16 megohms. It is quite apparent that this is not a limited value but that much higher impedances may be easily obtained by use of other values. Furthermore, the particular circuit and vibrator combination, in actual tests, provides substantially drift free operation over an eight hour period with .1 volt input providing substantially full scale deflection on the meter 18.

It will be observed in Fig. 2 that the A. C. amplifier 10 may comprise a pentode amplifier tube 26 and a triode tube 27 connected as a cathode follower while the D. C. amplifier 12 may be a single triode tube 28 connected as a cathode follower with the meter 18 in the cathode circuit.

Considering now the details of the circuits employed in the illustrated embodiment of Fig. 2, the input signal is applied to resistor $R_1$ through a low pass input filter consisting of resistor 29 and condenser 30. This filter reduces the effect of hum on the output D. C. current and also reduces feedback of noise from the amplifier to the input circuit. Following this filter and resistor $R_1$ is a condenser 31 for coupling the signal to the grid 32 of tube 26. The return for grid 32 is resistor 33 connected from that grid to ground. The cathode 34 and suppressor 35 are interconnected one with the other and to ground through the parallel arrangement of resistor 36 and bypass condenser 37 to provide the desired bias for the tube. The screen grid 38 is bypassed to ground by condenser 48 and is connected to the cathode 43 of tube 27 through a resistor 48a.

By connecting the screen 38 of the tube 26 to the cathode of tube 27, a small amount of degenerative feedback is obtained and the operation of tube 26 is controlled so that tubes of different transconductances may be used in the circuit without affecting the linearity and stability of the device. The plate circuit for tube 26 includes the plate 39 and series connected resistors 40 and 41 to a source of potential such as +300 volts D. C.

The tube 26 is coupled to the cathode follower 27 by an improved "bootstrap" circuit in order to realize the maximum gain of tube 26, and attain linear and highly stable operation. This is attained by direct connection of the plate 39 of tube 26 to the grid 42 of tube 27 and connection of the cathode 43 through the coupling condenser 44 to the junction of resistors 40 and 41. The plate 45 of tube 27 is connected directly to +300 volts D. C. while the cathode 43 is returned to ground through the cathode load resistor 46 and supplies the screen voltage for tube 26. The components are adjusted so that both ends of resistor 40 (which may be of the order of 500,000 ohms) are maintained at the same A. C. potential in which case the gain of tube 27 will be close to unity and constant current will flow through resistor 40. Under these conditions no signal voltage drop will appear across the internal plate resistance of tube 26 and the gain will closely approach the mu or amplification factor of the tube.

For example $$\text{gain} = \frac{e_{out}}{e_{in}} = \frac{muR}{\gamma_p + R}$$

Where $\gamma_p$ is the plate resistance and
$R$ is the load resistance.

Then if $\gamma_p = 0$ $$\text{gain} = \frac{muR}{R} = mu$$

The amplified A. C. signal now appearing at the cathode 43 of tube 27 is fed through the series connected condenser 47 and resistor 14 to the grid 49 of tube 28 which is bypassed to ground through condenser 16. The plate 50 is connected to +100 volts D. C. through a resistor 51 and the cathode 53 is connected to −100 v. D. C. through a potentiometer 54 and a resistor 55. The output circuit of tube 28 includes the meter 18 in series with a fixed resistor 56 and an adjustable calibrating resistor 57 connected between the movable tap 54' on resistor 54 and ground. The vibrator 20 and resistors $R_2$ and $R_3$ are connected as described in connection with Fig. 1, the high side of resistor $R_2$ being connected to the tap 54' on resistor 54.

As was discussed in connection with Fig. 1, the vibrator armature 21 in periodically contacting the fixed contact 22 produces a square wave input signal at the input to condenser 31. This signal upon amplification by tubes 26 and 27 appears at the cathode 43 of tube 27 and is fed through condenser 47 and resistor 14 to tube 28. However since resistor $R_3$ is of the order of several hundred ohms and resistor 14 about ½ megohm, when the armature 21 contacts the contact 23, substantially complete interruption of the signal occurs. This interruption being in properly phased relationship with the generation of the square wave input signal results in rectification or demodulation thereof. In addition, the resistor 14 and condenser 16 act as a low-pass filter so that a filtered D. C. signal appears at the grid 49 of tube 28. The output signal for actuation of the meter 18 then appears across the cathode and plate load resistors 54, 55, 51 and the internal resistance of tube 28. The cathode follower tube 28 thus not only provides a high impedance circuit for effective demodulation but also a low impedance output circuit for the meter and for attaining a low impedance circuit ($R_2$ and $R_3$) for the feedback signal so that effective modulation also can be secured.

In the illustrated embodiment of the invention the meter 18 has its zero position at mid-scale to facilitate reading positive and negative voltages without the need for an auxiliary switch. The meter is therefore connected between the tap 54' of resistor 54 which is coordinated with resistors 51 and 55 so that a zero reading will be secured when no signal input is applied. The adjustable resistor 57 and fixed resistor 56 are selected so that the reading on the meter can be accurately calibrated against a known input signal. The foregoing D. C. amplifier output and meter circuit has in addition to the advantages enumerated, the further advantage of protecting the meter 18 against damage due to the accidental application of excessive signals to the input of tube 26. By proper adjustment of resistor 51 in coordination with the dynamic plate resistance of tube 28, the positive current flowing through the meter can be limited to a predetermined maximum value and similarly the negative current may be limited by proper choice of resistors 54 and 55.

By operating the tube 26 within the linear portions of its operating curve, the output voltage will be directly proportional to the input signal and the calibration of the device at one voltage will automatically calibrate the device for all voltages. Multiple voltage ranges may, of course, be provided by inserting an appropriate voltage dividing system either at the input or by changing the feedback by altering the values of the resistors $R_2$ and $R_3$.

As to the stability of the system above described, only one time constant outside of the A. C. amplifier is involved namely that of resistor 14 and condenser 16 and actual experiment has indicated that this time constant does not vary sufficiently to affect the stability. It is desirable however that resistors $R_1$, $R_2$, $R_3$, 55, 56 and 57 have low temperature coefficients and it has been found that with good commercial components drifts of less than 2 millivolts will be obtained for periods of eight hours or more.

Although this invention has been described as a vacuum tube voltmeter, it is quite apparent that it may be used for other measuring and control applications requiring at least certain of the advantages offered by this circuit. Moreover, many changes, modifications and alternations may be made without departing from the true scope and spirit of the invention.

I claim:

1. A feedback amplifier circuit comprising in combination, first and second electron tubes, said first electron tube having at least a cathode, control electrode, screen electrode, and plate; said second electron tube having at least a cathode, control electrode, and plate; an input circuit coupled to said first electron tube for receiving an applied input voltage, means coupling the plate of said first tube to the control electrode of said second tube, first and second plate load impedance means coupled in series between the plate of said first tube and the positive terminal of a source of potential, means coupling the plate of said second tube to the positive terminal of said source of potential, means coupling the cathode of said first tube to the negative terminal of said source of potential, load impedance means coupling the cathode of said second tube to the negative terminal of said source of potential, a first feedback coupling means between the cathode of said second tube and the junction of said first and second plate load impedance means, and second feedback coupling means between the cathode of said second tube and the screen electrode of said first tube, said second feedback coupling means providing a negative feedback path from the plate of said first tube through said second tube to said screen electrode for stabilizing the gain of said first electron tube.

2. The feedback amplifier circuit as defined in claim 1 wherein said input circuit is adapted for coupling said applied input voltage between the control electrode of said first tube and the negative terminal of said source, and means adapted for coupling a utilization circuit between the cathode of said second tube and the negative terminal of said source.

3. A stabilized amplifier system comprising in combination, a pentode amplifier stage having an input circuit for receiving an applied voltage and having first and second series-coupled plate load impedances, a cathode follower stage having an input and output circuit, means coupling the output voltage across said first and second series-coupled anode load impedances to the input circuit of said cathode follower stage, means coupling the output voltage from the output circuit of said cathode follower stage to the junction of said first and second series-coupled load impedances, and means directly coupling the output voltage from the output circuit of said cathode follower stage to the screen grid tof said pentode amplifier for forming a negative feedback loop between the output of said pentode amplifier stage through said cathode follower stage to the screen grid of said pentode amplifier stage for stabilizing the gain of said pentode amplifier.

4. The stabilized amplifier system as defined in claim 3 wherein said means directly coupling the output circuit of said cathode follower stage to the screen grid of said pentode amplifier includes a low-pass filter.

References Cited in the file of this patent

UNITED STATES PATENTS

| | | |
|---|---|---|
| 2,435,331 | Street | Feb. 3, 1948 |
| 2,459,730 | Williams | Jan. 18, 1949 |
| 2,517,863 | Froman | Aug. 8, 1950 |
| 2,538,488 | Volkers | Jan. 16, 1951 |
| 2,615,064 | Stanton | Oct. 21, 1952 |
| 2,619,552 | Kerns | Nov. 25, 1952 |
| 2,685,000 | Vance | July 27, 1954 |

FOREIGN PATENTS

| | | |
|---|---|---|
| 630,780 | Germany | June 17, 1930 |
| 620,140 | Great Britain | Mar. 21, 1949 |
| 646,581 | Great Britain | Nov. 22, 1950 |

UNITED STATES PATENT OFFICE

CERTIFICATE OF CORRECTION

Patent No. 2,795,653

June 11, 1957

Rawley D. McCoy

It is hereby certified that error appears in the above numbered patent requiring correction and that the said Letters Patent should read as corrected below.

In the drawings, Sheet 2, Fig. 2, the lead extending between resistor 48a and condenser 47 should be conductively joined at its intersection with the lead extending between cathode 43 and resistor 46; column 4, line 75, for "excesive" read -- excessive --; column 5, line 29, for "alternations" read -- alterations --; column 6, line 27, for "tof" read -- of --.

Signed and sealed this 19th day of November 1957.

(SEAL)
Attest:
KARL H. AXLINE

Attesting Officer

ROBERT C. WATSON
Commissioner of Patents